(12) United States Patent
Yadav et al.

(10) Patent No.: US 12,413,753 B2
(45) Date of Patent: Sep. 9, 2025

(54) SYSTEMS AND METHODS FOR MULTI-PIPE SCHEDULING DURING IMAGE DECODING

(71) Applicant: Apple Inc., Cupertino, CA (US)

(72) Inventors: Ganesh G Yadav, Cupertino, CA (US); Sorin C Cismas, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 382 days.

(21) Appl. No.: 17/675,823

(22) Filed: Feb. 18, 2022

(65) Prior Publication Data

US 2023/0079090 A1 Mar. 16, 2023

Related U.S. Application Data

(60) Provisional application No. 63/243,831, filed on Sep. 14, 2021.

(51) Int. Cl.
| | |
|---|---|
| *H04N 19/436* | (2014.01) |
| *H04N 19/176* | (2014.01) |
| *H04N 19/186* | (2014.01) |
| *H04N 19/40* | (2014.01) |
| *H04N 19/423* | (2014.01) |

(52) U.S. Cl.
CPC ......... *H04N 19/436* (2014.11); *H04N 19/176* (2014.11); *H04N 19/186* (2014.11); *H04N 19/40* (2014.11); *H04N 19/423* (2014.11)

(58) Field of Classification Search
None
See application file for complete search history.

(56) References Cited

U.S. PATENT DOCUMENTS

| | | |
|---|---|---|
| 9,106,888 B2 | 8/2015 | Chou |
| 9,215,472 B2 | 12/2015 | Orr et al. |
| 9,218,639 B2 | 12/2015 | Cote et al. |
| 9,224,186 B2 | 12/2015 | Rygh et al. |
| 9,224,187 B2 | 12/2015 | Cote et al. |
| 9,270,999 B2 | 2/2016 | Cote et al. |

(Continued)

OTHER PUBLICATIONS

Nikoli, et al., "A synchronized visual-inertial sensor system with FPGA pre-processing for accurate real-time SLAM," 2014 IEEE International Conference on Robotics and Automation (ICRA), 2014, pp. 1-8.

*Primary Examiner* — Dave Czekaj
*Assistant Examiner* — Shanika M Brumfield
(74) *Attorney, Agent, or Firm* — Fletcher Yoder, P.C.

(57) ABSTRACT

The present disclosure relates to systems and methods of multi-pipe scheduling for image decoding. For example, a bitstream may include compressed slices that are scheduled to each of the multiple decoding pipelines present in the image processing circuitry of an electronic device. The bitstream may include image data that was encoded using variable-length coding. This results in some bits of the image data containing denser and/or sparser syntax elements and result in variable processing times. The scheduling circuitry may be able to monitor each of the multiple decoder pipelines rate of bit consumption and the number of bits initially scheduled to each of the multiple pipelines and the number of bits consumed by each of the multiple pipelines over time so that incoming compressed slices may be scheduled to the pipe that will be able to process the compressed slice the fastest.

20 Claims, 7 Drawing Sheets

(56) References Cited

U.S. PATENT DOCUMENTS

| | | |
|---|---|---|
| 9,292,899 B2 | 3/2016 | Schaub et al. |
| 9,299,122 B2 | 3/2016 | Okruhlica et al. |
| 9,305,325 B2 | 4/2016 | Cheng et al. |
| 9,336,558 B2 | 5/2016 | Cote et al. |
| 9,351,003 B2 | 5/2016 | Cote et al. |
| 9,380,312 B2 | 6/2016 | Cote et al. |
| 9,693,071 B1* | 6/2017 | Lin ................. H04N 19/184 |
| 10,827,178 B2* | 11/2020 | Nellore ............. H04N 19/436 |
| 2009/0177876 A1 | 7/2009 | Wang et al. |
| 2015/0092833 A1 | 4/2015 | Ku et al. |
| 2015/0092843 A1 | 4/2015 | Millet et al. |
| 2015/0092855 A1 | 4/2015 | Chou et al. |
| 2015/0295832 A1* | 10/2015 | Cotter .............. H04W 28/082 |
| | | 370/235 |
| 2016/0007038 A1 | 1/2016 | Chou et al. |
| 2016/0021385 A1 | 1/2016 | Chou et al. |
| 2017/0238000 A1* | 8/2017 | Ryu ................. H04N 19/119 |
| | | 375/240.02 |
| 2017/0302438 A1 | 10/2017 | Yang et al. |
| 2018/0089000 A1* | 3/2018 | Ryu ................. H04N 19/127 |
| 2019/0171895 A1* | 6/2019 | Wang ............... G06V 10/955 |

* cited by examiner

SYSTEMS AND METHODS FOR MULTI-PIPE SCHEDULING DURING IMAGE DECODING

CROSS-REFERENCE TO RELATED APPLICATIONS

This application claims priority to U.S. Provisional Application No. 63/243,831, entitled, "Systems and Methods for Multi-Pipe Scheduling During Image Decoding," filed Sep. 14, 2021, the disclosure of which is incorporated by reference in its entirety for all purposes.

SUMMARY

This disclosure relates to systems and methods of multi-pipe scheduling during image decoding. Specifically, optimizing scheduling of compressed slices to multiple decoder pipelines during the image decoding.

A summary of certain embodiments disclosed herein is set forth below. It should be understood that these aspects are presented to provide the reader with a brief summary of these certain embodiments and that these aspects are not intended to limit the scope of this disclosure.

Numerous electronic devices—such as cellular devices, televisions, handheld devices, and notebook computers—often display images and videos on an electronic display. To do this efficiently, many electronic devices include image decoding circuitry that parses and processes encoded video data to produce decoded video frames. As images and videos gain increasing resolution and dynamic range, the sizes of encoded bitstreams have also grown, which places an increasing burden on the image decoding circuitry.

SUMMARY

A summary of certain embodiments disclosed herein is set forth below. It should be understood that these aspects are presented to provide the reader with a brief summary of these certain embodiments and that these aspects are not intended to limit the scope of this disclosure.

The ability to assign compressed slices in a bitstream to multiple decoder pipelines for processing in parallel may enable more efficient decoding of the bitstream and reduce bottleneck effects during decoding. The dynamic assignment of slices of a bitstream for processing in parallel may enable dynamic adjustments based on the processing rate of each decoder pipeline of the decoder hardware. The bitstreams may include multiple syntax elements that are associated with multiple categories of syntax elements (e.g., fixed-length bit strings, fixed-length numerical values, and variable-length codes (VLC)). The different syntax elements included in the bitstream may affect the processing time it takes the multiple decoder pipelines to process the bits of the bitstream. Therefore, the ability to monitor bitstream processing and adjust slice assignment of the bitstream accordingly may reduce inefficiencies due to syntax element variability.

Thus, embodiments herein provide various apparatuses and techniques to reduce latency and inefficiencies in multiple decoder pipeline processing. To do so, embodiments disclosed herein enable scheduling circuitry to monitor slice processing for each decoder pipeline and monitor the number of bits processed over time per each decoder pipeline. For example, the image processing circuitry may include a scheduling processor that may be connected to the decoded frame output of the multiple decoder pipelines. The scheduling processor may track the initial number of bits scheduled to each of the one or more decoder pipelines. The scheduling processor may use control code (e.g., firmware, software) to monitor the number of bits processed by each of the one or more decoder pipelines at multiple points in time. The scheduling processor may then schedule the incoming compressed slices (e.g., bits) to a decoder pipeline based on the decoder pipeline that has processed the most bits and is currently the emptiest (e.g., has least number of bits in que to process). The scheduling processor may then transmit a command to schedule the incoming slice to the decoder pipeline that has the least amount of work scheduled (e.g., bits in the que) to reduce latency caused by scheduling a bitstream to a decoder pipeline that may have a greater number of bits left to process. This may also reduce gaps in processing and reduces inefficiencies in synchronizing decoding across the multiple decoder pipelines.

BRIEF DESCRIPTION OF THE DRAWINGS

Various aspects of this disclosure may be better understood upon reading the following detailed description and upon reference to the drawings described below.

DETAILED DESCRIPTION

Figure 1:
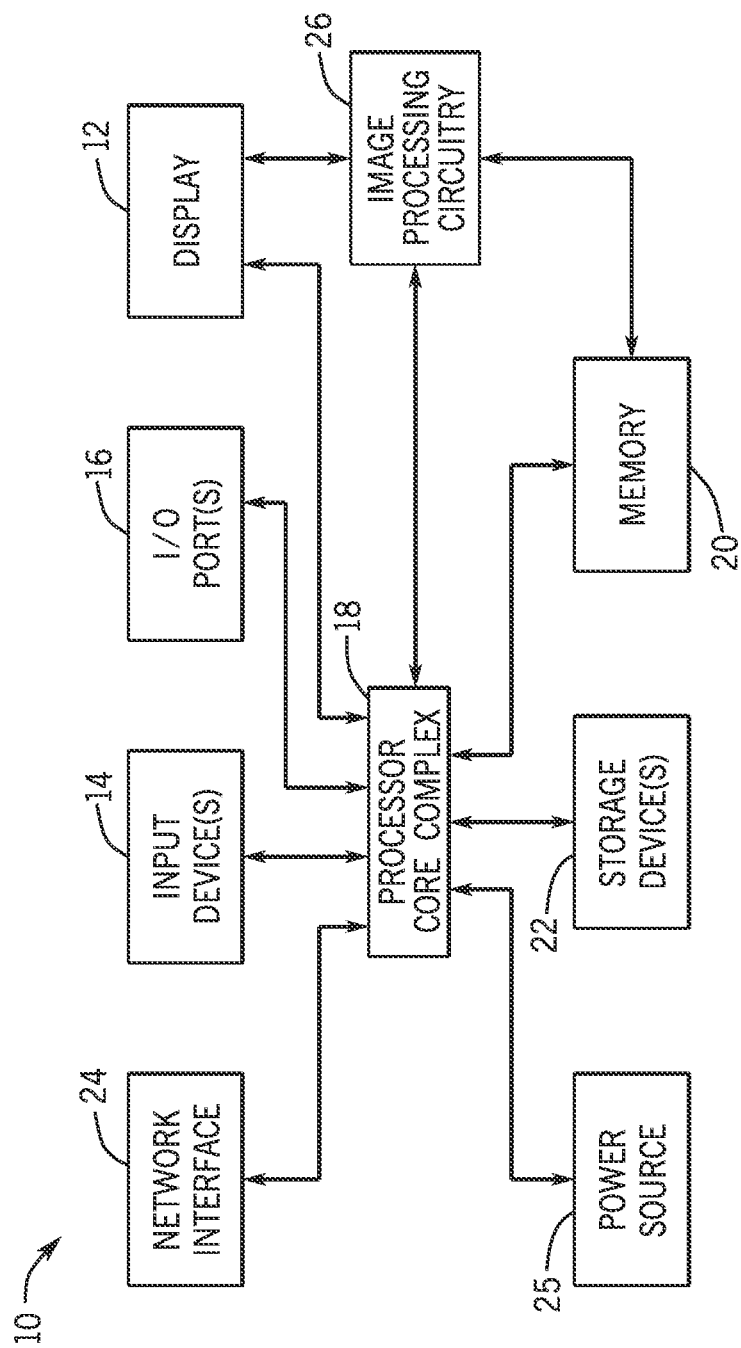
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure relates to image processing in electronic devices, more specifically to decoding of compressed image data (e.g., a bitstream). The electronic device may have the ability to assign compressed slices in a bitstream to multiple decoder pipelines for processing in parallel. The bitstreams may include multiple syntax elements that are associated with multiple categories of syntax elements (e.g., fixed-length bit strings, fixed-length numerical values, and variable-length codes (VLC)). The different syntax elements included in the bitstream may affect the processing time it takes the multiple decoder pipelines to process the bits of the bitstream. The variability in processing time may be due to variable-length coded syntax elements that may be present in the bitstream. For example, bits of equal number that are assigned to multiple decoder pipelines because of variability in syntax elements between the equal number of bits may result in different processing times for each of the multiple decoder pipelines. This may result in a bottleneck effect at one or more decoder pipelines as a result of one or more decoder pipelines taking a longer amount of time to process bits due to syntax element variability. Therefore, unnecessary delays may take place and result in inefficient decoder processing.

Embodiments herein provide various apparatuses and techniques to reduce latency and inefficiencies in multiple decoder pipeline processing. To do so, embodiments disclosed herein enable scheduling circuitry to monitor slice processing for each decoder pipeline and monitor the number of bits processed over time per each decoder pipeline. For example, the image processing circuitry may include a scheduling processor that may be connected to the decoded frame output of the multiple decoder pipelines. The scheduling processor may track the initial number of bits scheduled to each of the one or more decoder pipelines. The scheduling processor may run control code (e.g., control software, firmware) that monitors the number of bits processed by each of the one or more decoder pipelines at multiple points in time. The scheduling processor may then schedule the incoming compressed slices (e.g., bits) to a decoder pipeline based on the decoder pipeline that has processed the most bits and is currently the emptiest (e.g., has least number of bits in que to process). The scheduling processor running the control code may then transmit a command to schedule the incoming slice to the decoder pipeline that has the least amount of work scheduled (e.g., bits in the que) to reduce latency caused by scheduling a bitstream to a decoder pipeline that may have a greater number of bits left to process. This may also reduce gaps in processing and reduces inefficiencies in synchronizing decoding across the multiple decoder pipelines.

Additionally, the rate of bit consumption per each decoder pipeline may be tracked according to the scheduling control code. The scheduling processor running the scheduling control code may track the initial bits scheduled to each decoder pipeline and may monitor the number of bits processed by each of the decoder pipelines at one or more points in time. The scheduling processor running the scheduling control code may then calculate the rate of bit consumption for the multiple decoder pipelines. The rate of bit consumption may be used to schedule incoming slices of the bitstream to the one or more decoder pipelines based on current fill level (e.g., number of bits left to be processed) of each of the decoder pipelines and the rate of bit consumption for each of the decoder pipelines. The scheduling processor running the scheduling control code may include algorithms that take into account the rate of bit consumption and the fill level (e.g., number of bits left to be processed) of the decoder pipeline to schedule the bits more efficiently based on the decoder pipeline determined to process the bits that are already scheduled the fastest and therefore be the most efficient decoder pipeline to process the incoming bits.

With this in mind, an example of an electronic device 10, which includes an electronic display 12 that may benefit from these features, is shown in FIG. 1. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry that includes the one or more processors (e.g., a controller that controls one or more decoder pipelines), memory 20, one or more storage devices 22, a network interface 24, and a power source 25. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In other words, the network interface 24 may enable the electronic device 10 to transmit data (e.g., image data) to a communication network and/or receive data from the communication network.

The power source 25 may provide electrical power to operate the processor core complex 18 and/or other components in the electronic device 10, for example, via one or more power supply rails. Thus, the power source 25 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12. The touch sensing components may receive user inputs by detecting occurrence and/or position of an object contacting the display surface of the electronic display 12.

In addition to enabling user inputs, the electronic display 12 may facilitate providing visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for an RGB pixel arrangement).

The electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage 22. Additionally, in some embodiments, image data may be received from another electronic device 10, for example, via the network interface 24 and/or an I/O port 16.

Figure 2:
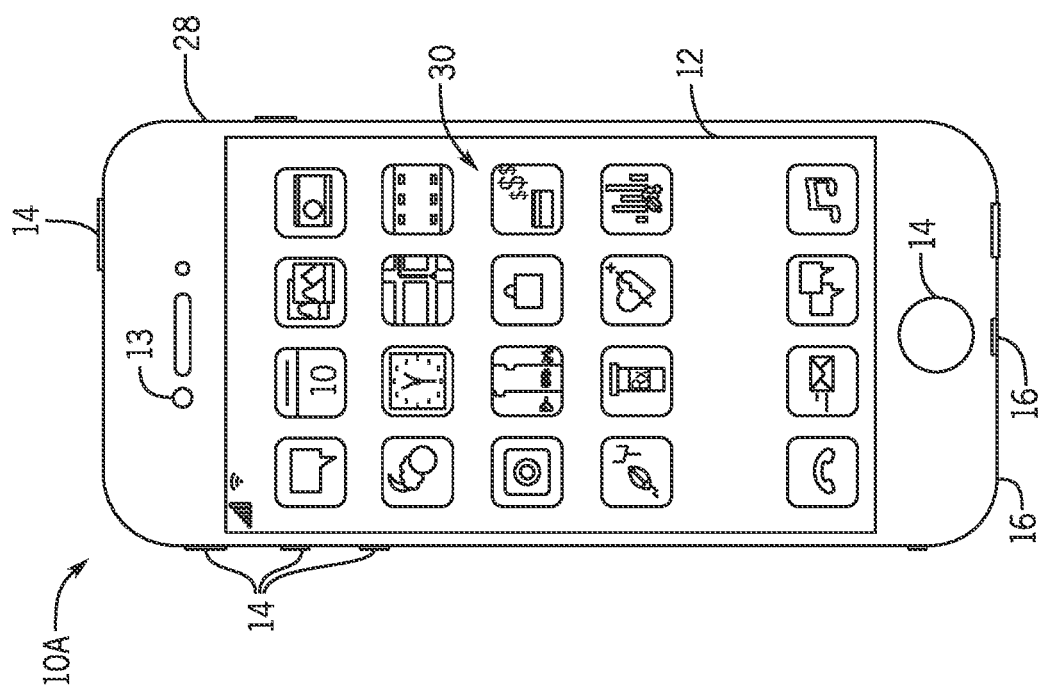
FIG. 2 is a front view of a mobile phone representing an example of the electronic device of FIG. 1, in accordance with an embodiment.

One example of the electronic device 10, specifically a handheld device 10A, is shown in FIG. 2. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 28 (e.g., housing). The enclosure 28 may protect interior components from physical damage and/or shield them from electromagnetic interference. In the depicted embodiment, the electronic display 12 is displaying a graphical user interface (GUI) 30 having an array of icons. By way of example, when an icon is selected either by an input device 14 or a touch sensing component of the electronic display 12, an application program may launch.

Input devices 14 may be provided through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 28. The I/O ports 16 may include, for example, a Lightning® or Universal Serial Bus (USB) port.

Figure 3:
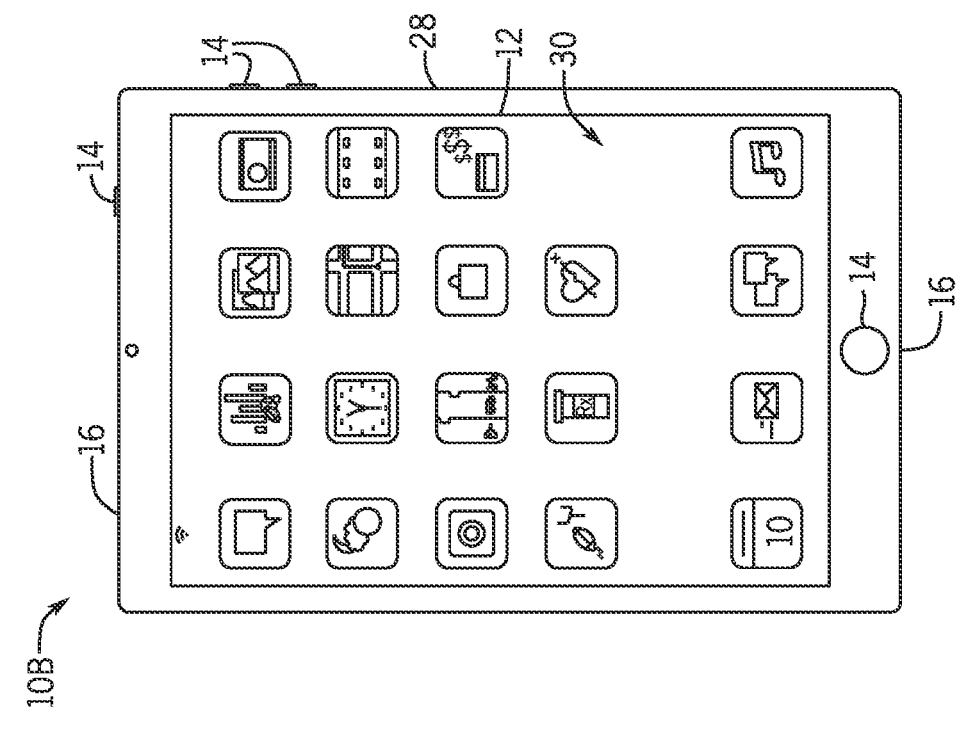
FIG. 3 is a front view of a tablet device representing an example of the electronic device of FIG. 1, in accordance with an embodiment.
Figure 4:
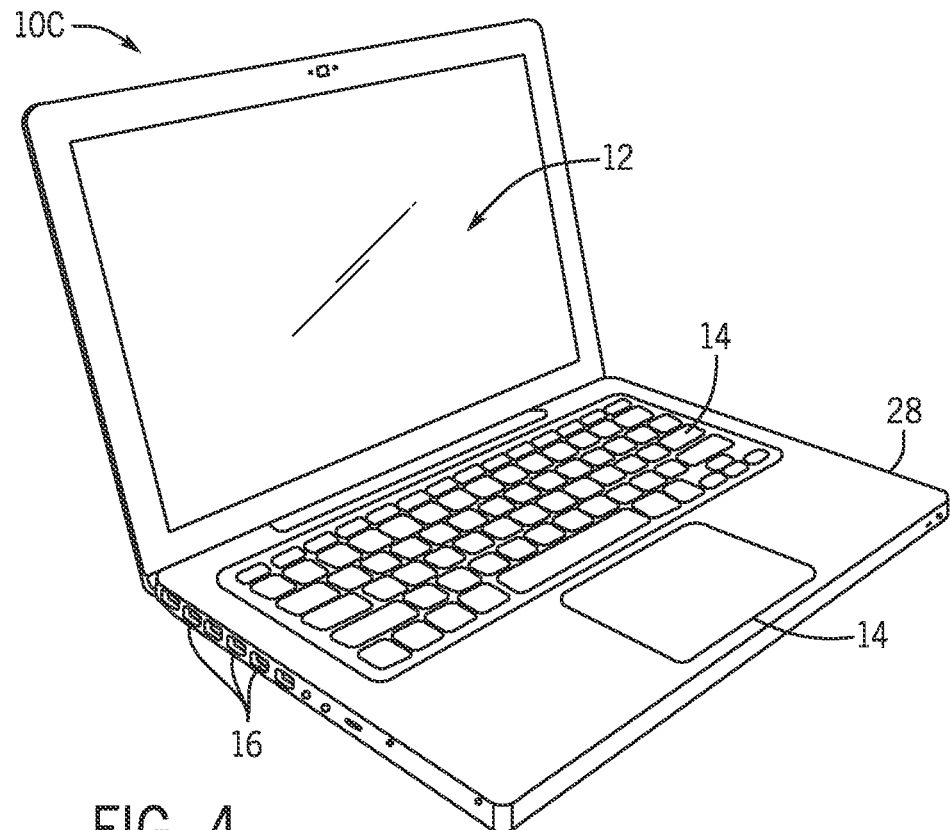
FIG. 4 is a front view of a notebook computer representing an example of the electronic device of FIG. 1, in accordance with an embodiment.
Figure 5:
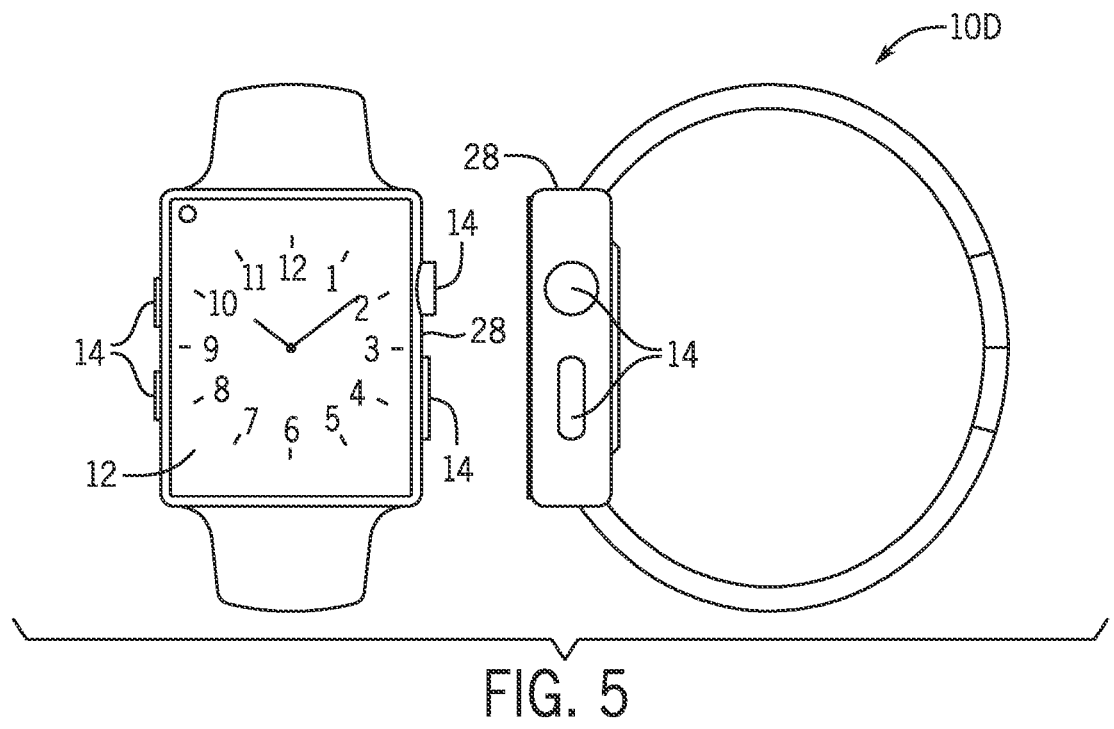
FIG. 5 are front and side views of a watch representing an example of the electronic device of FIG. 1, in accordance with an embodiment.

The electronic device 10 may take the form of a tablet device 10B, as shown in FIG. 3. By way of example, the tablet device 10B may be any iPad® model available from Apple Inc. A further example of a suitable electronic device 10, specifically a computer 10C, is shown in FIG. 4. By way of example, the computer 10C may be any MacBook® or iMac® model available from Apple Inc. Another example of a suitable electronic device 10, specifically a watch 10D, is shown in FIG. 5. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 28.

As discussed above, the image data may be encoded using multiple syntax elements that result in an encoded bitstream that includes the multiple syntax elements being sent to the multiple decoder pipelines. The variability in syntax elements may result in variable processing times for equal number bits that are schedule to multiple decoder pipelines for processing of the compressed image data.

Figure 6:
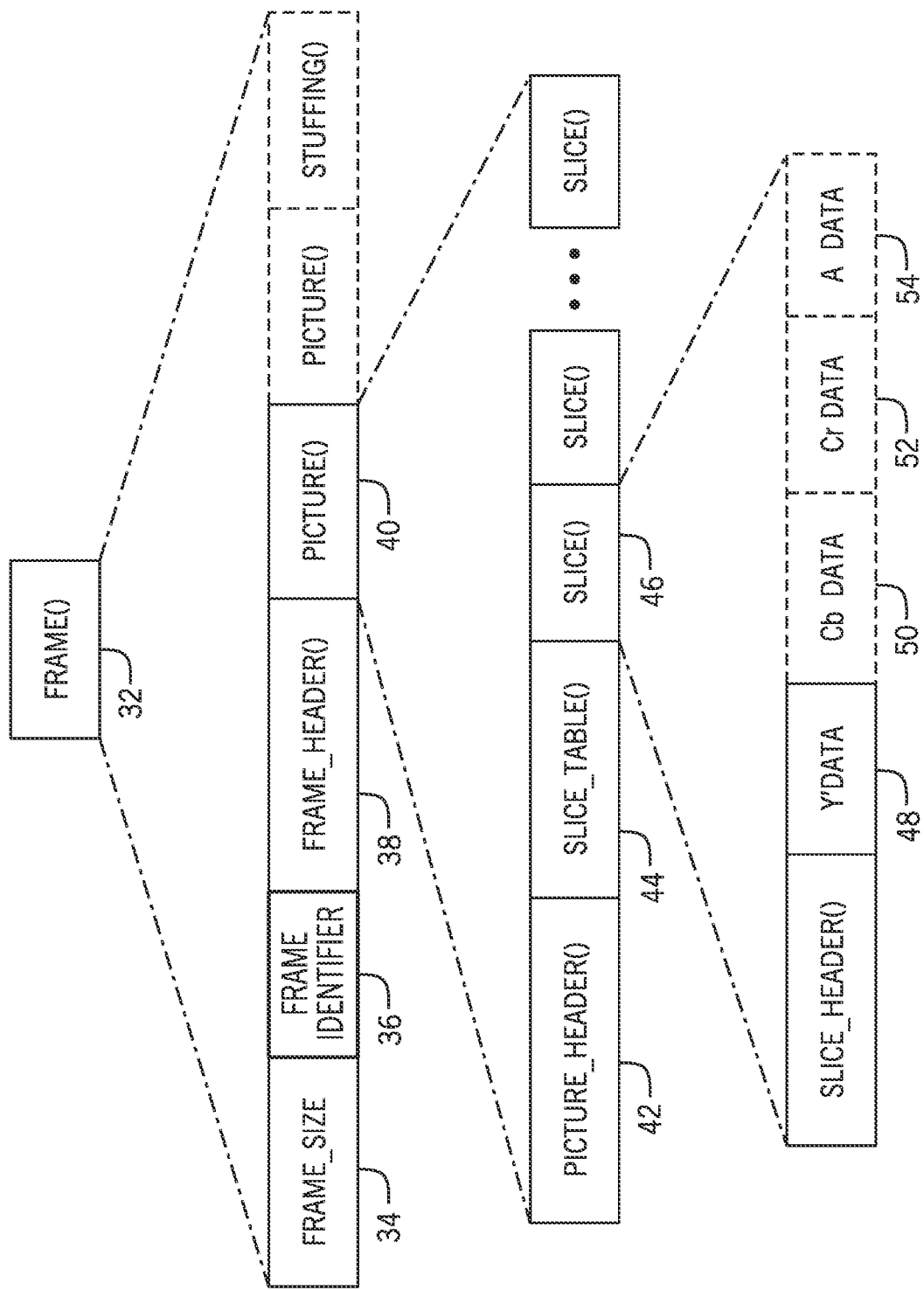
FIG. 6 is a schematic diagram of a bitstream syntax structure, in accordance with an embodiment.

With the foregoing in mind FIG. 6 is a schematic diagram of a bitstream syntax structure, according to embodiments of the present disclosure. The syntax elements included in the bitstream are used as parameters to define the compressed image and/or to direct decoding of the bitstream. The bitstream syntax may include a frame( ) syntax structure 32 which includes multiple syntax structures and elements that define the image frame. The syntax structures and elements included in the frame( ) syntax structure 32 include the frame_size 34 which designates the total size of a compressed frame in bytes for the image frame, the frame_identifier which identifies the frame type (e.g., Apple ProRes) 36, the frame_header( ) syntax 38 which signifies the start of the compressed picture data and defines various frame parameters (e.g., width and height of the frame in luma samples, sampling format of the frame), and the one more pictures( ) syntax 40 which defines syntax structures of a pictures header( ) 42 and the slice syntax structure 46. The slice syntax structure 46 includes the slice_table( ) 44 which designates the size of the slice and data corresponding to the color components of the frame which correspond to the luma (e.g., Y') 48 and chroma (e.g., Cb, Cr) 50, 52 values for each slice of the image frame. These data values include scanned quantized DCT coefficients for each color component (e.g., Y', Cb, Cr) present in the frame. The quantized DC and AC coefficients corresponding to the color components in the slice( ) syntax structure 46 are encoded using context adaptation and variable length code (VLC).

The bitstream syntax elements correspond to categories such as fixed-length bit strings, fixed-length numerical values, variable-length codes, and the like. The variable-length codes and bit strings appear in the bitstream left bits first and the numerical values appear with the most-significant bit first. For example, the fixed-length numerical values may correspond to size values designated for the image in the frame_size 34 and fix length bit-strings corresponding to the frame_idenfier 36 to designate frame type. The slice( ) 46 syntax as discussed above, may include AC and DC coefficient values and may also include alpha values that correspond to variable-length codes. The bitstream syntax may employ any combination of syntax elements and categories, such that the image can be decoded according to the decoder capabilities.

Figure 7:
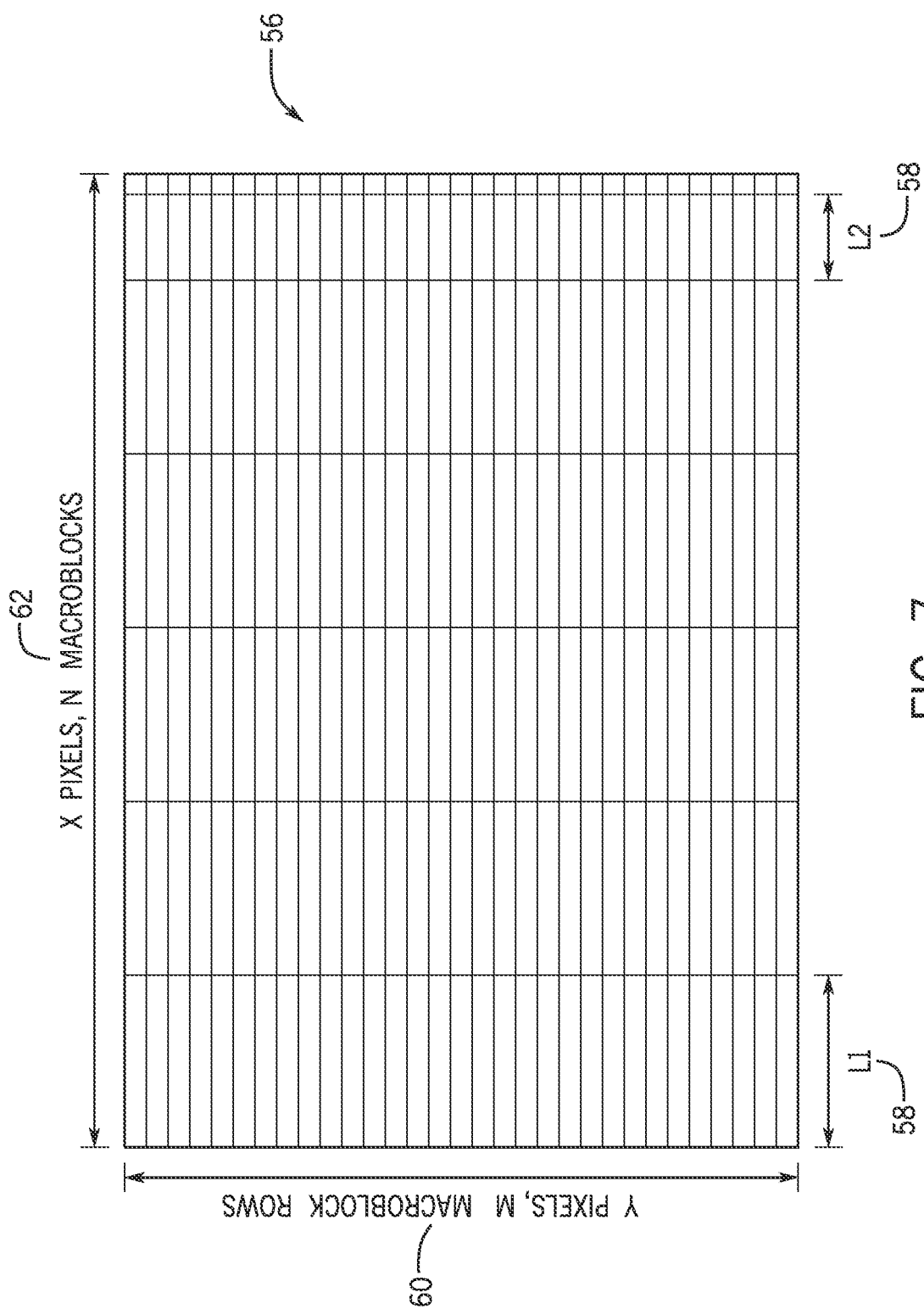
FIG. 7 is a schematic diagram of image frame structure, in accordance with an embodiment.

With the foregoing in mind, FIG. 7 is a schematic of picture slice arrangement for an encoded frame structure 56. The image data corresponding to the picture may be divided into macroblocks which may correspond to a 16×16 array of image pixels. The macroblocks may be further divided into blocks which correspond to 8×8 arrays of video component samples. Each respective macroblock may consist of luma and chroma data for the frame. Depending on the ratio of luma to chroma sampling the number of blocks in each macroblock may correspond to different luma and chroma components. For example in a 4:2:2 sampling structure each macroblock may include four Y' (e.g., luma) blocks, two Cb (e.g., blue chroma) blocks, and two Cr (e.g., red chroma) blocks. It should be understood that the macroblock may correspond to any Y'CbCr sampling structure (e.g., 4:4:4, 4:2:0).

The encoded frame structure 56 may be any suitable amount of X pixels high 62 and Y pixels wide 60. For example, the encoded frame structure 56 may be any number of suitable pixels wide 60 and suitable number of pixels high 62 depending on the encoded image data. The luma height and width of the source picture may correspond to a multiple of 16, such that the encoder may append sufficient rows of pixels to adjust the height and/or width of the pixels in the picture to correspond to a multiple of 16. The decoder may then discard the appended pixels during the decoding process. The size of the slice 58 may be designated to any desired size of macroblocks, such that the slice size may consist of 1, 2, 4, or 8 macroblocks. The slices 58 may be arranged in rows, with each slice 58 including the 8 macroblocks. The width of the source picture will correspond to the width of the macroblocks. For example the source picture may include 720 pixels for the width which corresponds multiple of 16, which would result in an encoded picture that is 45 macroblocks in height. In one example each slice 58 may contain 8 macroblocks as a designation, since the encoded picture in this example is determined to be 45 macroblocks in height, the last two slices 58 of the encoded frame may contain 4 macroblocks and 1 macroblock respectively so that each row contains seven slices with sizes of 8, 8, 8, 8, 8, 4, and 1 macroblock respectively. Any slice size of 1, 2, 4, or 8 macroblocks may be used to encode the frame structure 56 depending on the number of pixels in the frame.

As discussed above, the electronic device 10 may have the ability to assign compressed slices of a bitstream to multiple decoder pipelines for processing in parallel. The bitstream may include multiple syntax elements that are associated with multiple categories of syntax elements (e.g., fixed-length bit strings, fixed-length numerical values, and variable-length codes). The syntax elements associated with multiple categories included in the bitstream may affect the processing time it takes each decoder pipeline to process the bitstream. This may result in a bottleneck effect at one or more decoder pipelines as a result of equal number of bits being scheduled to each decoder pipeline and one or more decoder pipelines taking a longer amount of time to process the number of bits due to syntax element variability. For example, AC and DC coefficients in the bitstream are encoded using context adaptation. This may result in certain AC coefficients and DC coefficients having longer VLC and some AC coefficient and DC coefficients having shorter VLC depending on the amount of context adaption used during encoding for each AC and DC coefficient.

Figure 8:
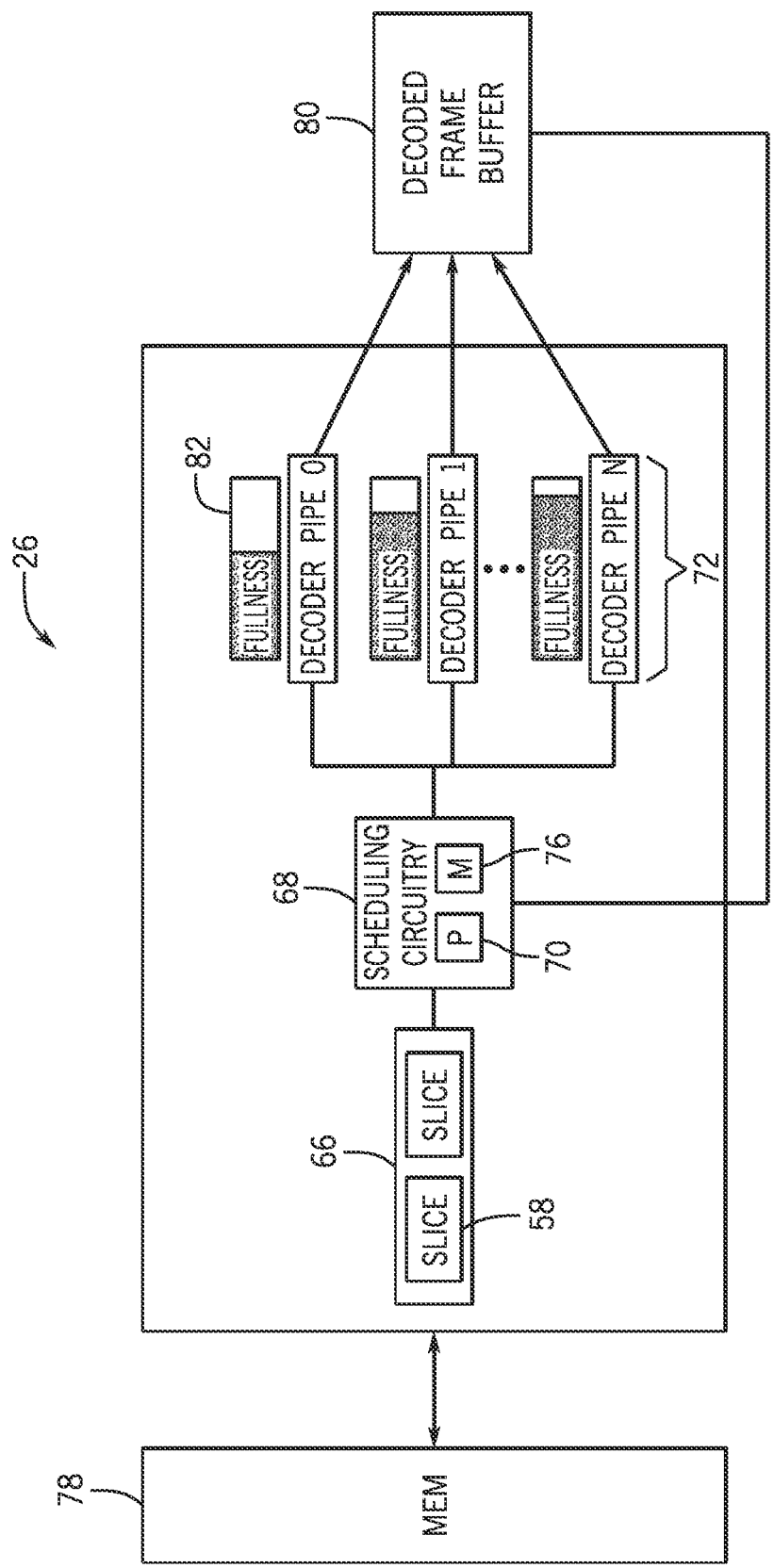
FIG. 8 is a block diagram of scheduling circuitry for multi-pipe scheduling, in accordance with an embodiment.

With the foregoing in mind, FIG. 8 is a schematic diagram of bitstream 66 scheduling to multiple decoder pipelines 72 of the electronic device of FIG. 1. The image processing circuitry 26 may include scheduling circuitry 68 that is able to schedule each of the compressed slices 58 of the bitstream 66 to one or more of the multiple decoder pipelines 72.

The scheduling circuitry 68 may include a processor 70 and a memory 76 and may be coupled to the image data input bitstream 66 and the output of the decoded frame buffer 80 output of the multiple decoder pipelines. The processor 70 and memory 76 may operate as the scheduling circuitry 68 by running a scheduling program (e.g., a scheduling algorithm, scheduling instructions, software, firmware). The scheduling circuitry 68 may also be part of the one or more processors 18 described above. The multiple decoder pipelines 72 may receive compressed slices 58 that are in the bitstream 66 and process each compressed slice 58 in the bitstream 66 to reconstruct the image frame from the encoded bitstream 66 data. The decoder pipelines 72 may be able to process the encoded bitstream data in one or more processing stages and produce decompressed frame data as a result of completing the decoding process. The number of decoder pipelines 72 may be any suitable number for efficient processing of the bitstream 66. For example, the number of decoder pipelines 72 may be 16 (e.g., decoder 0-15) or any other suitable number. The decoder pipelines 72 may complete an entropy decoding process that is applied to the compressed video components of the slice 58 to produce arrays of scanned color component quantized discrete cosine transform (DCT) coefficients. Additionally, the bitstream may also include an encoded alpha channel, and the entropy decoding may produce an array of raster-scanned alpha values. The one or more compressed slices 58 received at the multiple decoders pipelines 72 may include entropy-coded arrays of scanned quantized DCT coefficients that correspond to each luma and chroma color component (e.g., Y', Cb, Cr) that is included in the image frame. The quantized DC coefficients may be encoded differentially and the AC coefficients may be run-length encoded. Both the DC coefficients and the AC coefficients utilize variable-length coding (VLC) and are encoded using context adaptation. This results in some DC/AC coefficients being shorter in length and some being loner in length, such that processing time variability is present due to differences during context adaptation. This leads some portions of the bitstream 66 to include smaller DC/AC coefficients due to VLC that may process faster than other portions of the bitstream 54 due to variability in the DC/AC coefficients in the compressed slice 58.

The multiple decoder pipelines 72 may carry out multiple processing steps to reconstruct the image from the compressed slices 58 in the bitstream 66. The multiple decoder pipelines 72 may include an entropy decoding process, as discussed above that is applied to video components of the compressed slice 58. The entropy decoding produces arrays of scanned color component quantized DCT coefficients and may also produce an array of raster-scanned alpha values if the bitstream 66 includes an encoded alpha channel. The decoding process may then apply an inverse scanning process to each of the scanned color component quantized DCT coefficients to product blocks of color component DCT coefficients. The decoding process may then include an inverse quantization process that enables each of the color component quantized DCT coefficients blocks to produce blocks of color component DCT coefficients. The decoding process may conclude with each of the reconstructed color component values being converted to integral samples (e.g., pixel component samples) of desired bit depth and sending the integral samples from the decoder pipeline 72 to the decoded frame buffer 80.

The scheduling circuitry 68 may monitor the incoming compressed slices 58 in the bitstream 66 and schedule the incoming compressed slices 58 of the bitstream 66 to the decoder pipeline 72 that has processed the most bits and is the emptiest (e.g., fewest bits remaining in the que to be processed) of the multiple decoder pipelines 72 at time of scheduling. For example, the scheduling circuitry 68 may determine via the processor 70 that all decoder pipelines 72 are empty (e.g., contain no bits to be processed) at a first point in time and may schedule an equal amount of bits of the incoming slices 58 to each of the multiple decoders 72. This scheduling may occur in a sequential order such that the decoder pipeline 0 is scheduled first followed by decoder pipeline 1, 2, and so on. Scheduling to the decoder pipelines 72 may occur in any suitable order. The scheduling circuitry 68 may then at a later time after the first time (e.g., 1-512) monitor the number of bits consumed (e.g., decoded) by the multiple decoder pipelines 72 relative to the number of bits initially scheduled to determine the number of bits remaining in the que (e.g., remaining bits to be processed for each of the multiple decoder pipelines 72). Based on both the metrics of consumed and scheduled bits the scheduling circuitry 68 may calculate the emptiest pipe and schedule the incoming compressed slice 58 of the bitstream 66 to the determined most empty pipe. The remaining bits scheduled may be thought of as a fullness metric 82 for each of the decoder pipelines 72. For example, decoder pipeline 1 may have 800 bits remaining to process and may correspond to a metric of 50% fullness, whereas decoder pipeline 2 may have 1200 bits remaining to process and may correspond to a metric of 75% fullness. It should be understood that the number of bits corresponding to pipe fullness may also vary based on the compression scheme of the slice component assigned to each of the decoder pipelines 72. For example, the pipe with the biggest slice component scheduled may represent 100% fullness, but the number of bits within the biggest slice component may vary based on the compression scheme.

The scheduling circuitry 68 may also monitor the drain rate (e.g., rate of bit processing for each decoder) of the multiple decoder pipelines 72. The scheduling circuitry 68 may monitor how long it takes each pipeline to process all the bits scheduled per compressed slice cycle, and may monitor the drain rate per cycle. The scheduling circuitry 68 may utilize the drain rate in combination with the current bits remaining in a pipeline que to determine the pipeline that will be most efficient in processing the incoming compressed slice. For example, a decoder pipeline 1 may have 8 bits remaining to process and decoder pipeline 2 may have 4 bits remaining to process. The calculated drain rate for decoder pipeline 1 may be 3 times the drain rate of the decoder pipeline 2, so the scheduling circuitry 68 may determine that decoder pipeline 1 will result in the bits being processed more rapidly even though its current state and fullness level is greater than the decoder pipeline 2.

Figure 9:
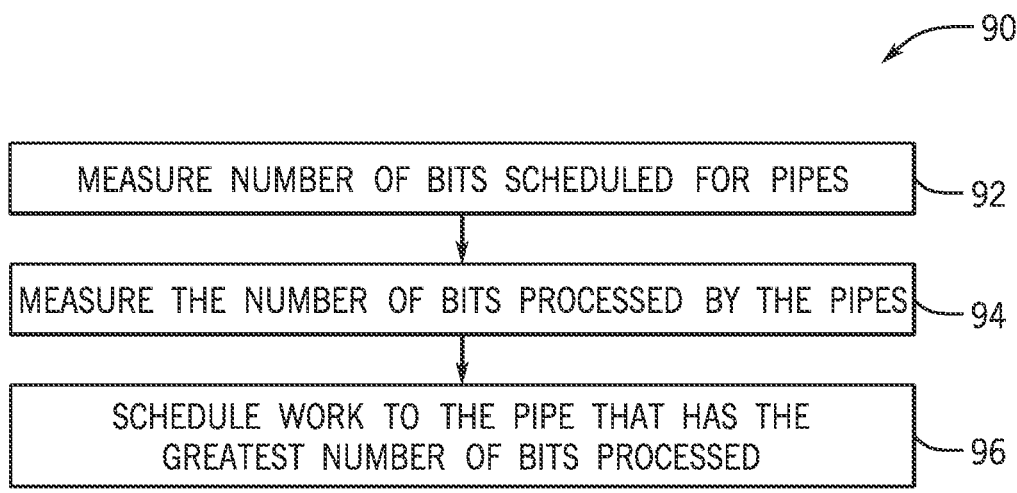
FIG. 9 is a flow diagram of a first method of the multi-pipe scheduling of FIG. 8, in accordance with an embodiment.

With the foregoing in mind, FIG. 9 is a flowchart of a method 90 of scheduling the incoming bitstream 66 to multiple decoder pipelines 72, according to an embodiment of the present disclosure. The scheduling circuitry 68 of the image processing circuitry 26 may determine the decoder pipeline 72 that is most efficient to use for the incoming compressed slices 58 of the bitstream 66 received. Any suitable device (e.g., a controller) that may control components of the electronic device 10, such as the processor 70 (e.g., of the scheduling circuitry 68), may perform the method 90. In some embodiments, the method 90 may be implemented by executing instructions stored in a tangible, non-transitory, computer-readable medium, such as the memory 76, using the processor 70. For example, the method 90 may be performed at least in part by one or more software components, such as an operating system of the electronic device 10, one or more software applications of the electronic device 10, and the like. While the method 90 is described using steps in a specific sequence, it should be understood that the present disclosure contemplates that the described steps may be performed in different sequences than the sequence illustrated, and certain described steps may be skipped or not performed altogether.

In process block 92, the processor 70 determines the number of bits scheduled to each of the pipelines (e.g., multiple decoder pipelines 72) at a first time, which may be an initial time of scheduling and/or any time in the scheduling process. The number of bits scheduled to each of the pipelines 72 may be determined based on the number of bits initially scheduled and/or last scheduled. The number of bits scheduled to each pipe 72 to be processed may be saved to a memory 76 of the scheduling circuitry 68. The number of bits scheduled for each of the pipelines 72 may be the same and/or variable depending on the scheduling method. The number of bits scheduled to each of the pipelines 72 may be monitored any suitable number of times throughout the bitstream 66 decoding process.

In process block 94, the processor 70 determines that number of bits that have been processed by each of the pipelines 72. The processor 70 may determine the number of bits processed by monitoring the decoded image frame data received at the output of the pipelines 72. The processor 70 may determine the number of bits consumed and use the number of bits initially scheduled to calculate the number of bits remaining to be processed by each of the pipelines 72. The processor 70 may utilize the consumed bit metric and the remaining bit metric to calculate the number of bits (e.g., work) remaining at each of the pipelines 72. The processor 70 may allocate a slice component 58 to each of the pipelines 72 and then may monitor the cycle time (e.g., time to process the slice component).

In process block 96, the processor 70 may determine based on the number of bits consumed at each of the pipelines 72 and the number of bits initially scheduled to each of the pipelines 72 to determine the pipe that has processed the most bits (e.g., has the least amount of work remaining). The processor 70 sends the incoming slice component 58 to the emptiest pipe (e.g., pipe that has processed the greatest number of bits). The processor 70 may repeat the method 90 at multiple time points to allocate work (e.g., slice components) to the pipe that can process the slice components the fastest. This may reduce latency in the decoding process and optimize synchronization of decoding across the multiple pipelines.

Figure 10:
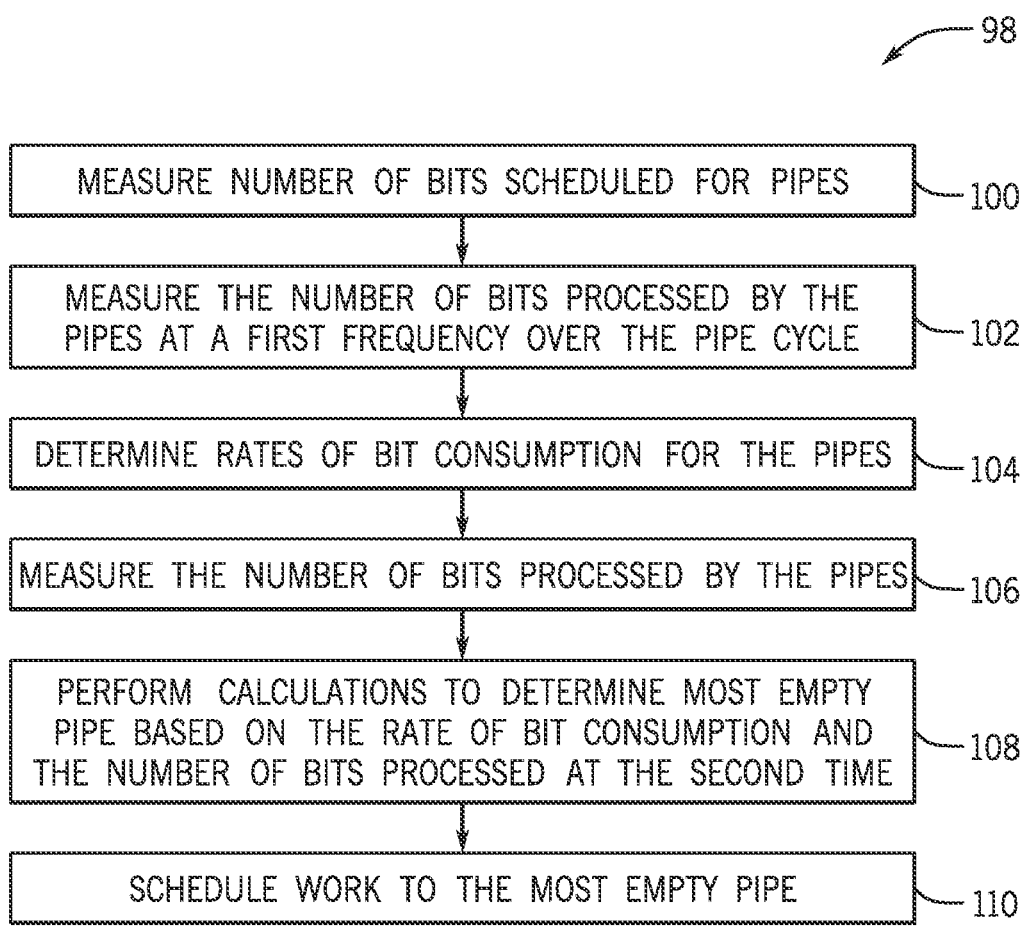
FIG. 10 is a flow diagram of a second method of multi-pipe scheduling of FIG. 8, in accordance with an embodiment.

With the foregoing in mind, FIG. 10 is a flowchart of a second method 98 of scheduling the incoming bitstream 66 to multiple decoder pipelines 72, according to an embodiment of the present disclosure. The scheduling circuitry 68 of the image processing circuitry 26 may determine the decoder pipeline 72 that is most efficient to use for the incoming compressed slices 58 of the bitstream 66 received at the multiple decoder pipelines 72. Any suitable device (e.g., a controller) that may control components of the electronic device 10, such as the processor 70 (e.g., of the scheduling circuitry 68), may perform the method 98. In some embodiments, the method 98 may be implemented by executing instructions stored in a tangible, non-transitory, computer-readable medium, such as the memory 76, using the processor 70. For example, the method 98 may be performed at least in part by one or more software components, such as an operating system of the electronic device 10, one or more software applications of the electronic device 10, and the like. While the method 98 is described using steps in a specific sequence, it should be understood that the present disclosure contemplates that the described steps may be performed in different sequences than the sequence illustrated, and certain described steps may be skipped or not performed altogether.

In process block 100 following an initial scheduling of bits of an encoded bitstream to the pipelines, the processor 70 determines the number of bits scheduled to each of the pipelines (e.g., multiple decoder pipelines 72) at a first time, which may be an initial time of scheduling and/or any time in the scheduling process. The number of bits scheduled to each of the pipelines 72 may be updated over time to reflect scheduling. The number of bits scheduled to each pipe to be processed may be saved to a memory 76 of the scheduling circuitry 68. The number of bits scheduled for each of the pipelines 72 may be the same and/or variable depending on the scheduling method. The number of bits scheduled by to each of the pipelines 72 may be monitored any suitable number of times throughout the bitstream 66 decoding process.

In process block 102, the processor 70 determines the number of bits that have been processed by each of the pipelines 72 at a first frequency over the pipeline cycle. For example, the processor 70 may determine that the initial number of bits scheduled to each of the pipelines 72 was 14, the processor 70 may determine at multiple points in time, depending on the desired frequency, the number of bits processed by each of the pipelines 72. The frequency may be based on the cycle time of the pipe and/or other metrics that can be used to define processing time of the pipelines 72.

In process block 104, the processor 70 may calculate a rate of bit consumption for each of the pipelines 72. This rate may be determined based on the previously calculated values for bits processed and bits scheduled for each of the pipelines 72. The rate of consumption determined for each of the pipelines 72 may be updated depending on the frequency of the bits processed.

In process block 106, the processor 70 determines the number of bits processed by each of the pipelines 72. In process block 108, the processor 70 determines based on the rate of consumption of bits determined for each of the pipelines 72 and based on the number of bits processed at the second time, the most efficient pipeline to schedule the incoming work to. For example, pipeline 1 may have a determined drain rate of 4 bits/per cycle and have 8 bits remaining to be processed and pipeline 2 may have a determined drain rate of 2 bits/cycle and have 7 bits left to process. Even though pipeline 2 has less work remaining, based on the drain rate pipeline 1 should complete its overall work faster and be the most efficient pipe to schedule the incoming work to. This calculation process may be based on the metrics of drain rate, bits consumed, and bits previously scheduled may be performed for each of the pipelines 72. The processor 70 may perform this process over time as the number of bits and drain rate per cycle of each pipeline may be updated for each of the pipelines 72 over time.

In process block 110, the processor 70 schedules the incoming bits to the pipeline that was determined to be the emptiest, based upon both the drain rate and the number of bits remaining to be processed by the pipeline. This method may account for variability in syntax elements present in the bitstream, and improve synchronization across the decoder pipelines 72.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
a plurality of decoding pipelines configured to decode encoded source image data; and
one or more processors configured to:
direct scheduling circuitry of the one or more processors to initially schedule bits of an encoded bitstream of the encoded source image data to the plurality of decoding pipelines;
determine a greatest number of bits processed in each of the plurality of decoding pipelines; and
direct the scheduling circuitry of the one or more processors to schedule compressed slices of the encoded bitstream to a selected decoding pipeline of the plurality of decoding pipelines based at least in part on the number of bits initially scheduled and the greatest number of bits processed for the selected decoding pipeline.

2. The electronic device of claim 1, wherein the one or more processors are configured to:

determine an average rate of bit processing for each of the plurality of decoding pipelines based on determining one or more rates of bit processing at one or more time intervals after the bits are initially scheduled; and direct the scheduling circuitry of the one or more processors to schedule the compressed slices of the encoded bitstream to the selected decoding pipeline based at least in part on the average rate of bit processing of the selected decoding pipeline.

3. The electronic device of claim 2, wherein the one or more processors are configured to:

direct the scheduling circuitry of the one or more processors to schedule compressed slices of the encoded bitstream to the selected decoding pipeline based at least in part on the average rate of bit processing of the selected decoding pipeline and based on the plurality of decoding pipelines that has a lowest number of remaining bits left to process.

4. The electronic device of claim 2, wherein the one or more processors are configured to:

determine a predicted future rate of bit processing for each of the plurality of decoding pipelines; and direct the scheduling circuitry of the one or more processors to schedule compressed slices of the encoded bitstream to the selected decoding pipeline based at least in part on the predicted future rate of bit processing of the selected decoding pipeline.

5. The electronic device of claim 1, wherein the encoded bitstream comprises syntax elements that correspond to variable-length codes, fixed-length bit string, and fixed-length numerical values that cause the plurality of decoding pipelines to process bits of the encoded bitstream at different processing rates.

6. The electronic device of claim 1, comprising a decoder frame buffer coupled to an output of the plurality of decoding pipelines.

7. An electronic device comprising a plurality of decoding pipelines configured to decode encoded source image data, wherein the plurality of decoding pipelines are coupled to one or more processors configured to:

monitor an encoded bitstream that is received at the plurality of decoding pipelines;

determine a number of bits of the encoded bitstream scheduled to each of the plurality of decoding pipelines at a first time;

determine a greatest number of bits processed in each of the plurality of decoding pipelines in a first interval of time between the first time and a second time; and direct scheduling circuitry of the one or more processors to schedule incoming compressed slices of the encoded bitstream to a decoding pipeline of the plurality of decoding pipelines based at least in part on the number of bits scheduled at the first time and the greatest number of bits processed in each of the plurality of decoding pipelines in the first interval of time.

8. The electronic device of claim 7, wherein the one or more processors are configured to determine a respective rate of bit processing for each pipe of the plurality of decoding pipelines by determining a time for each decoding pipeline of the plurality of decoding pipelines to process the number of bits of the encoded bitstream scheduled to each of the plurality of decoding pipelines at the first time.

9. The electronic device of claim 8, wherein the one or more processors are configured to:

update the respective rate of bit processing for one or more of the decoding pipelines at a plurality of time points during the decoding of the encoded source image data.

10. The electronic device of claim 7, wherein the encoded bitstream comprises syntax elements that correspond to variable-length codes, fixed-length bit string, and fixed-length numerical values.

11. The electronic device of claim 7, wherein the one or more processors are configured to:

determine a fullness level of each decoding pipeline of the plurality of decoding pipelines based on the number of bits processed by each decoding pipeline of the plurality of decoding pipelines at the first time and the second time.

12. The electronic device of claim 7, wherein the encoded bitstream comprises scanned quantized DCT coefficients for each luma and chroma color component present in the encoded source image data.

13. The electronic device of claim 7, wherein the one or more processors are further configured to determine a rate of bit processing for a cycle for each decoding pipeline of the plurality of decoder pipelines.

14. The electronic device of claim 13, wherein the rate of bit processing for each cycle comprises a time it takes the plurality of decoding pipelines to process one or more bits of the encoded bitstream from a first decoding pipeline processing stage to a last decoding pipeline processing stage.

15. The electronic device of claim 14, wherein the decoding pipeline processing stages comprise an inverse quantization process, an entropy decoding process, or both.

16. A tangible, non-transitory, machine-readable medium comprising instructions that, when executed by processing circuitry, causes the processing circuitry to perform operations comprising:

receiving an encoded bitstream;

determining a number of bits of the encoded bitstream scheduled to each of a plurality of decoding pipelines at a first time;

determining a greatest number of bits processed in each of the plurality of decoding pipelines at a second time; and scheduling incoming bits of the encoded bitstream to a decoding pipeline of the plurality of decoding pipelines based at least in part on the number of bits scheduled at the first time and the greatest number of bits processed for each of the plurality of decoding pipelines at the second time.

17. The tangible, non-transitory, machine-readable medium of claim 16, wherein the processing circuitry causes operations further comprising:

determining an average rate of bit processing for each of the plurality of decoding pipelines over an interval between the first time and the second time; and scheduling compressed slices of the encoded bitstream to a selected decoding pipeline based at least in part on the rate of bit processing of the selected decoding pipeline.

18. The tangible, non-transitory, machine-readable medium of claim 17, wherein the processing circuitry causes operations further comprising:

scheduling compressed slices of the encoded bitstream to the selected decoding pipeline based at least in part on the rate of bit processing of the selected decoding pipeline and based on the plurality of decoding pipelines that has a lowest number of bits remaining based on the number of bits processed by each of the plurality of decoding pipelines at the second time.

19. The tangible, non-transitory, machine-readable medium of claim 17, wherein the processing circuitry causes operations further comprising:
  determining a predicted future average rate of bit processing for each of the plurality of decoding pipelines; and
  scheduling compressed slices of the encoded bitstream to the selected decoding pipeline based at least in part on the predicted future average rate of bit processing of the selected decoding pipeline.

20. The tangible, non-transitory, machine-readable medium of claim 16, wherein the encoded bitstream comprises syntax elements that correspond to variable-length codes, fixed-length bit string, and fixed-length numerical values.

* * * * *